United States Patent [19]
Russ et al.

[11] Patent Number: 5,657,320
[45] Date of Patent: Aug. 12, 1997

[54] METHOD AND SYSTEM FOR RESOLVING CONTENTION OF SPARE CAPACITY CIRCUITS OF A TELECOMMUNICATIONS NETWORK

[75] Inventors: Will Russ, Dallas; Mark Wayne Sees, Plano; Lee Dennis Bengston, Murphy; Clinton Allen Wagner, Allen, all of Tex.

[73] Assignee: MCI Corporation, Washington, D.C.

[21] Appl. No.: 468,302

[22] Filed: Jun. 6, 1995

[51] Int. Cl.⁶ .................................................. H04L 12/24
[52] U.S. Cl. ........................ 370/217; 370/221; 370/228; 340/825.01
[58] Field of Search .............................. 370/16, 16.1, 54, 370/79, 85.2, 94.3, 216, 217, 221, 225, 228; 340/825.01, 825.16

[56] References Cited

U.S. PATENT DOCUMENTS

| | | | |
|---|---|---|---|
| 4,872,163 | 10/1989 | Follett et al. | 370/94.1 |
| 5,124,983 | 6/1992 | Landez et al. | 370/85.6 |
| 5,146,452 | 9/1992 | Pekarske | 370/16 |
| 5,218,601 | 6/1993 | Chujo et al. | 370/16 |
| 5,357,506 | 10/1994 | Sugawara | 370/60 |
| 5,435,003 | 7/1995 | Chng et al. | 395/575 |
| 5,444,693 | 8/1995 | Arslan et al. | 370/16 |
| 5,463,615 | 10/1995 | Steinhorn | 370/16 |
| 5,495,471 | 2/1996 | Chow et al. | 370/16 |
| 5,513,345 | 4/1996 | Sato et al. | 395/182.02 |

Primary Examiner—Russell W. Blum

[57] ABSTRACT

The present invention provides to a distributed restoration scheme a set of timers so that multiple senders and choosers can more fairly contend for the spare capacity of a telecommunications network. In particular, a preactivation timer would force a sender that had reserved excess spare capacity of the network for restoring its own failed links to release any unused spare capacity prior to the time that it terminates its operation, provided that it has found an alt-route or alt-routes for its failed link. An alarm validation timer and a hold off timer in the invention scheme further provide for respective validation and detection that a detected fault is not transient or intermittent in nature and that a restoration process is needed to find the alt-routes.

44 Claims, 7 Drawing Sheets

METHOD AND SYSTEM FOR RESOLVING CONTENTION OF SPARE CAPACITY CIRCUITS OF A TELECOMMUNICATIONS NETWORK

FIELD OF THE INVENTION

This invention relates to telecommunications networks and more particularly to a method of and system for resolving contention between different sender/chooser pairs of the spare capacity circuits of a network to restore disrupted connections of the network after a network failure.

BACKGROUND OF THE INVENTION

A telecommunications network comprises a plurality of nodes connected together by means of for example optical fibers. If any of the fibers are cut, the traffic through a portion of the network is disrupted. To remedy this disruption, automatic protection switching is ordinarily provided to move disrupted traffic to dedicated spare circuits promptly, typically in less than 50 milliseconds. But this automatic protection switching requires a high dedicated spare channel capacity.

To avoid automatic protection switching in restoring disrupted traffic, there are some conventional methods that deal directly with each node of the network. Each node consists generally of one or more are digital cross-connect switches. One of these restoration methods is a distributed restoration algorithm (DRA), a variant of which is often referred to as the self-healing network (SHN) method. SHN is an algorithm which rims independently in each of the nodes of a mesh network which have spans connecting adjacent nodes. In order to provide a fast and reliable method of restoring traffic affected by fiber cuts and other failures using SHN, the intelligence is distributed in the network and is based specifically on signalling between nodes. Such signalling may be referred to as the use of signatures and/or messages. Signatures are dynamic in that they are sent on a continuous basis into the nodes, and more specifically into the digital cross-connect hardware in each node where the state of the signature represents a given logic that changes from frame to frame. Upon receipt of these signatures, SHN would react. There are several signature types in SHN and these signatures may be in band or out of band, as they can actually ride with the traffic as part of the payload itself or can superpose on the overhead as part of the supervisory overhead of a signal such as for example in a SONET network.

Each node running SHN conveys the signalling between itself and its adjacent node. Thus, a signature is sent from node to node and each node in turn realizes the logical span(s) to which it is attached. As designed, a logical span contains a multiple number of links and connects two given nodes. A link in turn is a communications channel of any size, for example a DS3 or a DS1 standard communications signal.

A SHN null signature is exchanged between the nodes and carries the information necessary for a node to identify its neighbor(s). Thus, each node knows exactly which other node(s) it is connected to and has an identification of the logical span connecting it to those nodes. The null signatures are sent continuously and thus continuously update each node of its neighbor's presence for a given link. The status, in terms of the functioning of each link, is therefore reinforced continuously.

Whether a link in the network is a spare link or a working link is provisioned by the management of the network which in turn knows where the spare links and the working links of the network are. The spare links in essence are dedicated links that provide a capacity for restoration and which otherwise do not carry any traffic. These spare links are used only when the system detects a failure of a given link, or a set of links, in a logical span by some means, such as for example the detection of a lost signal or a maintenance signal by a line terminating element (LTE) in the cross connect switch of a node.

Once a link is determined to be in alarm, a node, more specifically the cross connect switch in the node, will retrieve the stored information received from the null signatures in an arbitration process to determine what node is connected on the other side of the failed link. In other words, the adjacent nodes sandwiching the failed link each have a node ID. From the arbitration process, one of the nodes is determined to be a sender and the other a chooser. These two adjacent nodes, the sender and the chooser, make up a custodial pair of nodes. A number of different arbitration methods may be used, such as one where numbers (node IDs) are assigned to the different nodes with the node having the lower node ID becoming the sender while the node with the higher node ID becoming the chooser.

Having decided on a custodial pair of nodes, a flooding process for searching alternate routes, or alt-routes, is next started by the sender. Alt-routes are spare routes that traffic disrupted by the failed link may be directed to reach the chooser.

The flooding process in SHN sends signatures into spare links. These flooding signatures or flooding messages carry certain information such as the sender node ID, the chooser node ID and an index. The index is simply a unique number that represents a given flooding route, for example a given flooding demand that will allow the logic in the nodes downstream from the broadcasting node to determine whether two signatures are different or are the result of a multi-cast of the same signature, or whether each signature represents a unique flooding pattern. Nodes downstream from the sender, which may be referred to as tandem nodes, will receive the signatures and detect a state change on the spare paths. The signatures will be multicast out to a particular spare link of each logical span terminates at a tandem node. The spanning out of these signatures throughout the network will reach the chooser eventually through one or more of the tandem nodes if one or more all routes exist.

A chooser recognizes that a flooding signature is meant for it by looking for its own node ID at the chooser node ID field. The chooser then responds to a given unique sender/chooser index combination by sending a complementary restoration signal, or a reverse linking message or signature. This signature travels back through the same path, or the same alt-route, to the sender to inform the sender that it has indeed reserved an alt-route for that particular demand and that the chooser is awaiting the arrival of the restored traffic. Alt-routes may be chosen by a chooser based on any arbitration method since a given sender/chooser index may arrive from several different logical spans, or links within a logical span. Typically, the shortest path, based on a number of hops or repeat counts measured or detected by the chooser node, is chosen.

Regardless of the method of arbitration a chooser uses, it will reserve the particular span that it has reversed linked onto and will typically ignore and discard any other signatures arriving from any other links with that same sender/chooser index. Incoming ports, or precursor ports, and outgoing ports of the tandem nodes along the alt-route are reserved by the reversed linking message so that a particular path through the matrix of each cross connect switch of a tandem node is mapped. The reverse linking signatures are transmitted back to the sender to let the sender know that an alt-route has been reserved by the chooser and the tandem nodes along the alt-route. Any priority function of choosing which traffic to connect onto the alt-route is performed at this time.

A second method for restoring traffic due to failed fiber cuts is a centralized restoration scheme. This second method depends on a centralized intelligence that has a built in knowledge of the different nodes and links of the network, and a defined solution for a particular failed connection. There are advantages and disadvantages to this centralized restoration scheme. One of the disadvantages is that the topology of the network has to be stored in a centralized database and has to be updated every time a change occurs in the network. Thus, the implementation of the centralized restoration scheme becomes more difficult and extensive when the network changes very rapidly, such as for example when links are added, removed, failed, or changes in the network. Such changes occur when spare links are changed to working links or vice versa. In any event, the important aspect of a centralized restoration scheme is reliance on a central intelligence and the ability to dynamically update this intelligence so that it knows the proper state of the network at the time of a failure.

On the other hand, the DRA mentioned previously distributes the intelligence among the different nodes of the network so that the intelligence of the network is gained from the signals and messages from the adjacent nodes and/or the nodes downstream from where the failure occurred. Thus, in the DRA scheme, a far away or far end node can use the network itself and the current state of the network as it is updated so that it knows exactly on which logical span a traffic is to be routed and how many links are on each logical span and what kind of links are on it. This means that the switching commands and the ability to find and reserve alt-routes, as well as the ability to switch the proper traffic into and out of those alt-routes, are all performed in each node individually using a distributed intelligence with a distributed set of rules, logic and mathematical algorithm. Thus, the DRA has the advantage over the centralized restoration scheme of being faster on a network wide level.

There are two different forms of distributed restoration algorithm. One is the span or link based distributed restoration scheme in which SHN is an example of where attempts are made to find alt-route between two custodial nodes. The second form of DRA is a path based scheme in which the shortest and/or most reasonable end-to-end alt-route throughout the network is to be found. The jointed or connected set of links throughout the network of a given circuit forms the alt-route for this scheme. These conventional link based schemes theoretically treat the failure of a single logical span between two nodes, irrespective of the number of links within that span, as a single fiber cut.

However, in actuality, when a fiber cut does occur as, for example, results when trench digging equipment cuts a cable, a number of cuts actually may occur, because a single cable contains many fibers. In addition, all of the cuts may not occur at the same time. Because of the differences in time in which the different links of a span, or the different spans within a cable, are cut, a "greedy characteristic" is introduced into a real life SHN scheme which heretofore was not accounted for. In essence, the greedy characteristic results from the sender of the first cut circuit performing a so-called preemptive activated flooding in which it floods its restoration signals to a sufficient number of the available spare links of the network so as to reserve alt-routes for each link of the spare. This preemptive activated flooding is used by the failed circuit to more quickly find alt-routes in the event of a partial failure of some links of a given span. Thus, it floods as if all of the links of a given span do eventually fail. In other words, with the first cut in a span, a preemptive activated flooding is performed to reserve sufficient spare capacity so that the traffic through most, if not all, of the links of the span can be restored.

But such preemptive activated flooding in fact can locate and reserve an excessive number of alt-routes, i.e., finding more alt-routes than it actually needs for a logical span. The sender of this cut circuit then would hold onto the spare circuits indefinitely until its restoration process is terminated.

Thus, if more than one logical span of the network is cut, or different circuits such as links at different spans are cut at approximately the same time, multiple sender/chooser pairs will become active. A race condition would ensue among the different senders of the cut circuits to contend for the spare capacity and the alt-routes. Accordingly, there is no fair contention process between the multiple senders, as the sender that first initiates flooding and having its reverse linking done before the others have a chance to flood and reserve any alt-routes could in actuality reserve nearly all of the alt-routes in the network for itself. It could therefore prevent other cuts from being repaired expeditiously.

There is therefore a need to provide a method, and a system therefor, of resolving the contention among multiple senders, and their respective demands, for the spare capacity of the network for restoring disrupted traffic after network failures.

SUMMARY OF THE PRESENT INVENTION

To obtain a more equitable resolution of the contention problem, the present invention institutes a set of timers and, by means of their interactions, provides a contention scheme for senders and choosers to share, as much as possible, the limited resources, i.e., the spare capacity and the spare links, of the network.

One of the timers provided is a preactivation timer which prompts the sender to release any spare resources that it has reserved when an alt-route for a particular failed link has been found within a given time period. In particular, in a SHN flooding scenario where all of a sender's links in alarm have been restored and a given time period has passed such that it becomes less and less likely that more links are going to fail, the unused yet reserved alt-routes are forced released so that they may be utilized by other senders to thereby alleviate the greedy characteristic of the SHN preemptive activation type flooding.

The early release of the unused reserved alt-routes is based on the configuration of the preactivation timer which, upon expiration, will force an early sender time-out to release the particular sender's unused yet reserved alt-routes. The configuration of the time period of the preactivation timer is such that the preactivation timer will expire much earlier than the timer provided for the sender time-out, in order to assure that other senders would have sufficient time to utilize the alt-routes released by the particular sender.

Other timers such as a hold-off timer and an alarm validation timer are also configured in the present invention for further enhancing its operation.

It is therefore an objective of the present invention to provide a preactivation timer that allows the present invention to benefit from a faster overall route finding via preemptive activation flooding, while at the same time limiting the disadvantage of excessive reservation of spare links by some sender/chooser pairs to the detriment of other sender/chooser pairs.

It is another objective of the present invention to provide timers whose values are user configureable, thereby giving the network management flexibility in resolving contention of spare capacity by multiple senders.

It is yet a further objective of the present invention to provide an independent preactivation timer for the sender of each custodial pair of unique sender/chooser nodes.

It is yet another objective of the present invention to provide a set of timers whose interactions maximize the efficient restoration of a network due to failed circuits.

BRIEF DESCRIPTION OF THE FIGURES

The above-mentioned objectives and advantages of the present invention will become more apparent and the invention itself will be best understood by reference to the following description of an embodiment of the invention taken in conjunction with the accompanying drawings, wherein.

DETAILED DESCRIPTION OF THE PRESENT INVENTION

Figure 1:
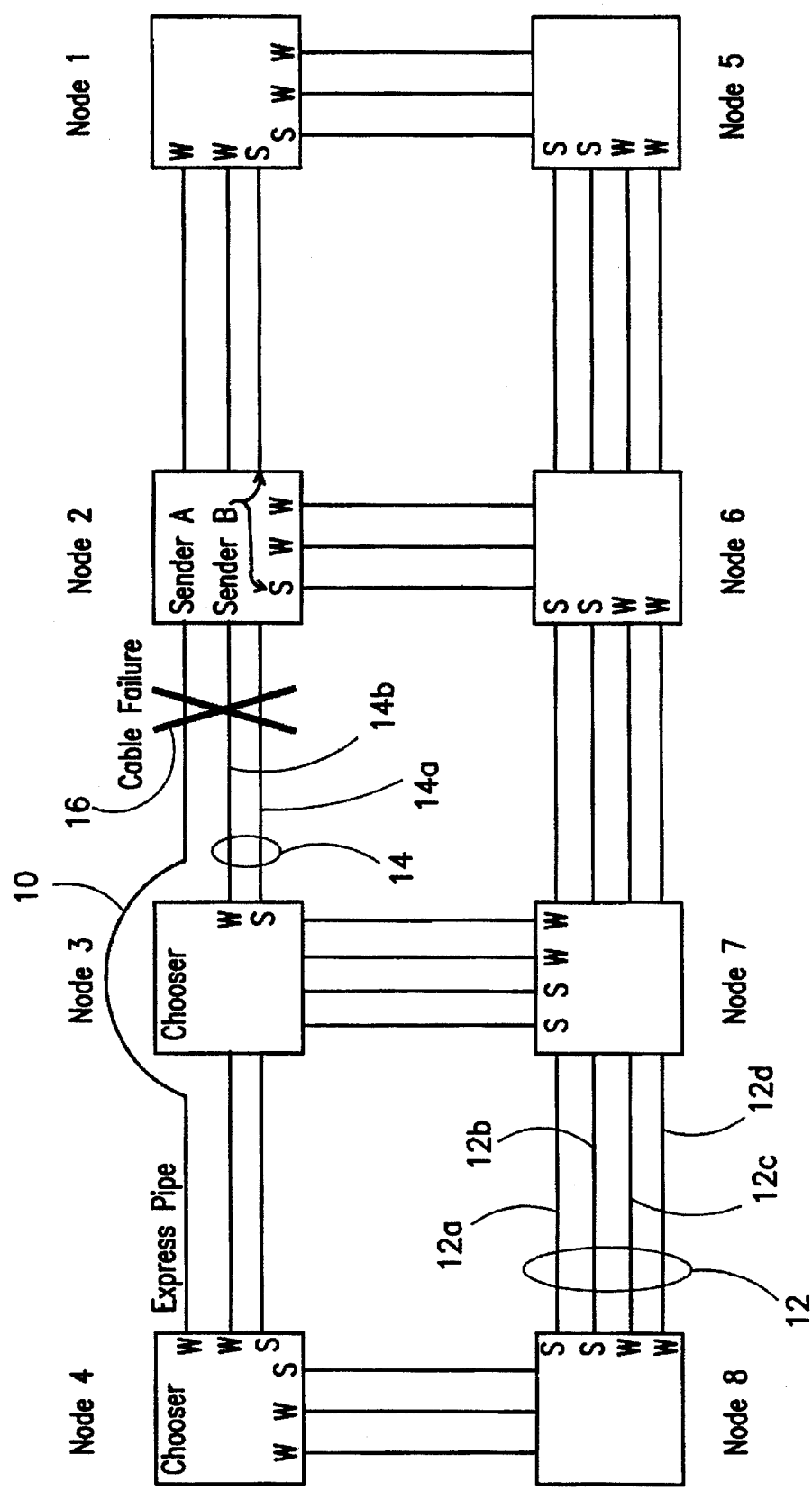
FIG. 1 is an illustration of a number of nodes in a telecommunications network in which two senders are formed within a single node in response to a cable failure.

With reference to FIG. 1 it can be seen for illustration purposes 8 nodes of a telecommunications network, namely node 1 to node 8 for example. Within each of these nodes are a number of working links, designated W, and spare links designated S. Each of the nodes may be connected to another node, such as for example an adjacent node as exemplified by nodes 6 and 7, or a node further downstream, such as the connection of node 2 to node 4 by means of an express pipe 10.

For the exemplar embodiment shown in FIG. 1, each node is assumed to be connected to another node by a span, such as 12 shown between nodes 7 and 8. Within each of the spans there are number of links such as for example links 12a, 12b, 12c and 12d. Further, each node has a number of ports, namely Ss and Ws, for providing connection to the links. As was mentioned before, ports W provide connection for the working links while ports S provide connection for the spare links.

The interconnections between nodes 2, 3 and 4 are somewhat different from those of the other nodes for the instant embodiment of FIG. 1 in that in addition to being connected to its adjacent node 3 via links 14a and 14b, node 2 is also connected to node 4 by means of express pipe 10. Thus, for the FIG. 1 embodiment of the instant invention, it should be recognized that a node does not necessarily need to be connected to its adjacent nodes.

In contrast to the prior art in which it was simply assumed that all of the links of a given logical span would fail precisely at the same time when it is cut, the inventors of the instant invention recognized the fact that, in actual practice, when a cut occurs at a span, the links in that span would be cut sequentially. Moreover, as in the case of the embodiment shown in FIG. 1, the fact that node 2 is connected to both nodes 3 and 4 by different spans 10 and 14 means that a cut such as that indicated by cable failure 16 would cut both express pipe span 10 and span 14. Thus, for the FIG. 1 embodiment, a fiber cut would affect both connections between nodes 2 and 3 and nodes 2 and 4. Thus, there is a sender/chooser pair for nodes 2 and 4 and another sender/chooser pair for nodes 2 and 3 resulting from cable cut 16.

For the discussion at hand, for custodial pair of nodes 2 and 4, by means of the arbitration method mentioned above, it is presumed that the sender is node 2 while the chooser is node 4. Likewise, for the custodial pair of nodes 2 and 3, it is assumed that sender is node 2 while chooser is node 3. And in order to differentiate between the two pairs of senders and choosers, for the FIG. 1 embodiment, the first pair of sender/chooser for custodial pair of nodes 2 and 4 is shown to have sender A while the pair of sender/chooser for custodial pair of nodes 2 and 3 is shown to have sender B. Having thus designated two senders A and B in node 2, it nonetheless should be appreciated that instead of both senders being located at one node, it could very well be that both choosers are in one node and the senders in respective different nodes. Or for that matter it could very well be that more than two senders are located in one node while their corresponding multiple choosers are located at different nodes. That notwithstanding, the important point to recognize here is that there are more than one senders vying for the spare capacity, i.e., the spare links, of the network.

As was mentioned previously, SHN distributed restoration may begin by means of preemptive activation flooding. In essence, a preemptive activation flooding enables a sender to quickly find alt-routes in the event of a partial failure of some links of a given span. Putting it in a different perspective, the sender essentially would want to flood its restoration signals or messages to the spare links so as to reserve as much capacity as it needs to provide for what it perceives to be the eventuality that all links of a given span are to fail because of the cut. In other words, the sender wants to provide for all of the links in the event that all of those links were to fail. And by preemptively reserving the alt-routes, the restoration process could be expedited, at least with respect to that particular pair of sender and chooser, since routes have already been reserved for links that might be cut.

Yet such preemptive activated flooding introduces a "greedy characteristic" into the restoration scheme because of the excessive number of alt-routes that are reserved by the particular pair of sender/chooser. And given the fact that conventional SHN provides for only a single iteration of the protocol of flooding and then finding of the alt-routes, the conventional SHN scheme will hold onto all of the reserved alt-routes indefinitely until the entire process is terminated. Such termination of process may be referred to as a "sender timeout".

To elaborate, for the example shown in FIG. 1, if for illustration purposes the custodial pair of sender/chooser represented by sender B of nodes 2 and 3 were to flood and reserve all spare links before the pair of custodial sender/ chooser represented by sender A of nodes 2 and 4 were able to do so, then in the case of multiple failures, sender A would not be able to repair its failed link. Putting it differently, a race condition exists among the senders, i.e., there is contention between senders A and B for spare capacity and alt-routes. Thus, if one sender initiates flooding and the reverse linking by its corresponding chooser is done before another sender has a chance to flood and reserve alt-routes, then the second sender would have to wait until the first sender times out. The second sender might not therefore have enough time to reserve any alt-routes released by the first sender, particularly if the respective spans of the first and second senders failed approximately at the same time. There is accordingly no fair contention scheme among the separate senders in conventional SHN logic.

Figure 2:
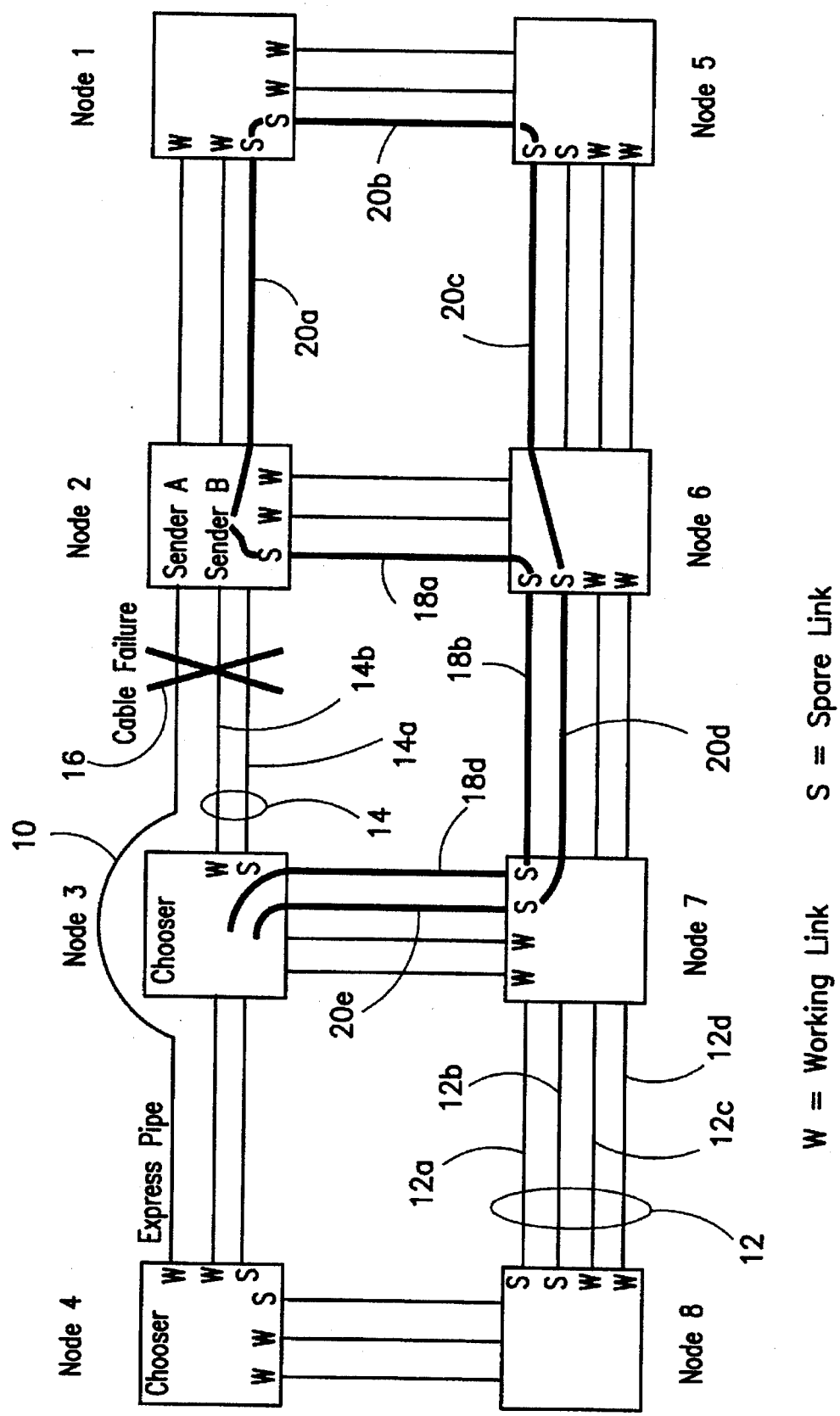
FIG. 2 is a repeat of the FIG. 1 illustration but with details added thereto of the alt-routes being reserved by an first sender (sender B) due to the "greedy characteristic" resulting from the self-healing network (SHN) distributed restoration algorithm (DRA) scheme.

This is particularly illustrated in FIG. 2 in which sender B is assumed to have began its preemptive flooding of restoration signals to other nodes prior to sender A. Thus, as shown, sender B has reserved two alt-routes between nodes 2 and 3 through the available spare links. As shown, the first alt-route, designated 18 comprising sections 18a, 18b and 18c, extends from node 2 to node 6 to node 7 and finally to node 3. The second alt-route reserved by sender B from node 2 to node 3, designated 20 and including sections 20a, 20b, 20c, 20d and 20e, goes from node 2 to node 1 to node 5 to node 6 to node 7 and finally to node 3. And assuming that there are only two spare links for node 2 and each having been reserved by alt-routes 18 and 20, sender A is left with no spare capacity for its restoration of its failed link between nodes 2 and 4.

As shown in FIG. 2, the second alt-route 20 for sender B is not needed since the first alt-route 18 will restore the only link (14b) in alarm between nodes 2 and 3. Note that spare link 14a is not a working link and therefore has no traffic which needs to be rerouted. Yet under the FIG. 2 scenario, the logic provided at the chooser at node 3 will respond by reverse linking for each of the unique sender/chooser index arriving thereat. This is because the chooser in node 3 has no knowledge of the restoration demand. Accordingly, the second alt-route 20 is reserved by sender B for the duration of its operation until its sender time-out, even though alt-route 20 is not needed.

In the meantime, as mentioned above, sender A cannot flood its restoration signals to the adjacent nodes because the spare links for node 2 had all been flooded into or reserved by sender B, who in a race with sender A for the use of the spare links, has already flooded into both spare links. Thus, sender B would wait for the termination of its operation before it will release the spare links to which it has reserved, i.e., alt-route 20. And in the case where the termination of operation for both senders, for example senders A and B, are essentially at the same time, then sender A would not have the time or opportunity to utilize the spare links, i.e., alt-route 20, released by sender B which would become available only nearly at the time that sender A also ceases its restoration operation. Moreover, even if the restoration operation of sender A were to be extended sufficiently to allow it to reserve the now released spare links of sender B, such practice of allowing sender A the opportunity to flood restoration signals to released spare links entails, needless to say, additional restoration time.

To overcome this hoarding problem and particularly the contention problem between multiple sender/chooser pairs, there is instituted in the instant invention a number of timing devices, i.e., timers. One of these timers, hereinafter known as preactivation timer, forces the first sender to release the alt-routes that it had reserved provided that it has found an alt-route to restore the traffic disrupted by all of its failed links. The operation of the preactivation timer, and the other timers of the system of the instant invention, are shown with reference to FIG. 3.

Figure 3:
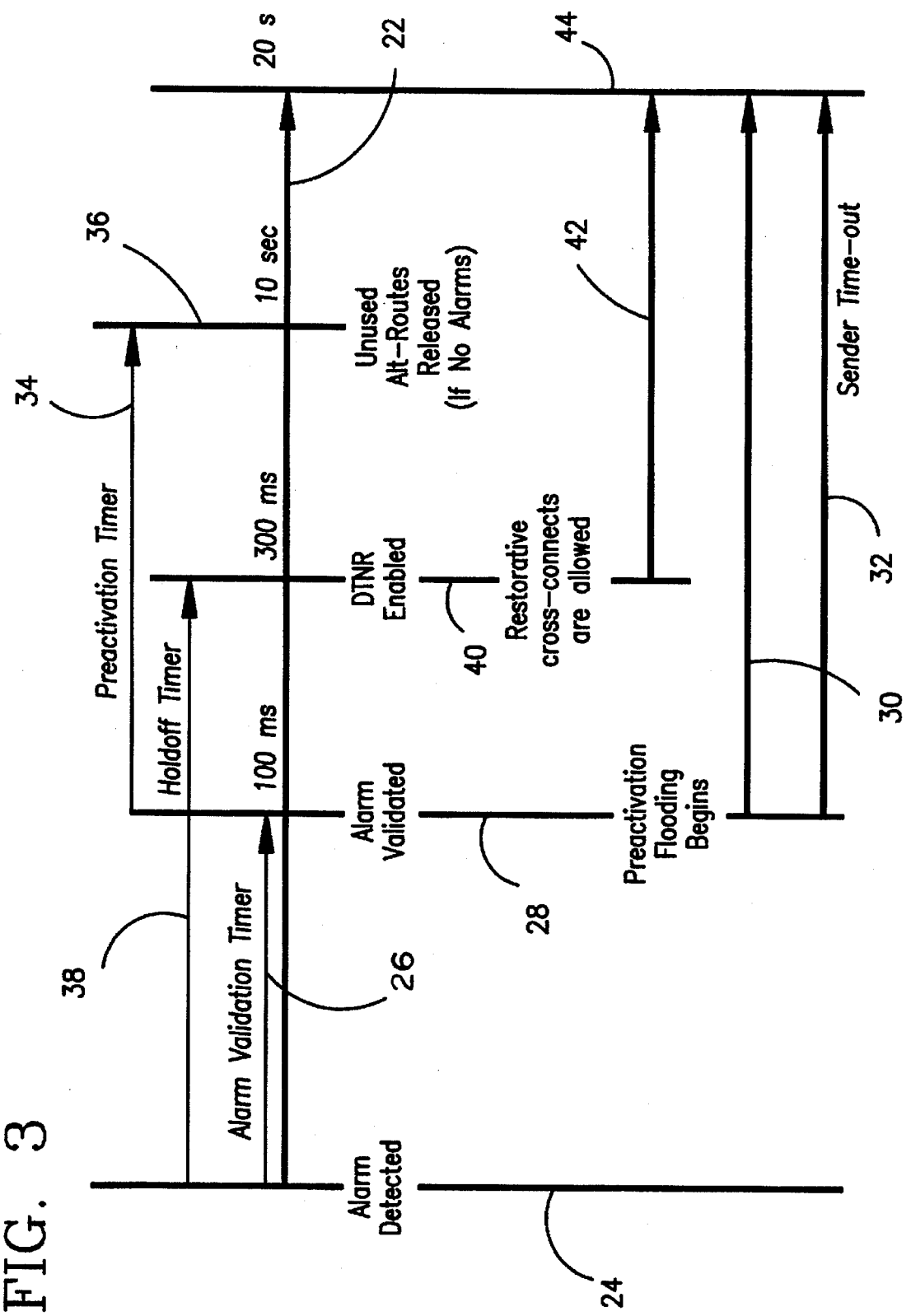
FIG. 3 is an illustration of the relationship between the different timers employed in the instant invention.

As shown, FIG. 3 is a time diagram illustrating the different timers and events that take place along a time line 22. To begin with, assume that there are only two sender/ chooser pairs in the embodiment of FIG. 2. Further assume that by means of an arbitration method in which the lower numbered node is deemed to be the sender, a decision has been made that there are now senders A and B each in node 2 with respective choosers in node 3 and 4. Next, senders A and B are allowed to race by doing their own preemptive activation floodings and retaining their own greedy characteristics. Thus, as shown in the example of FIG. 2, sender B ends up reserving all of the spare links to await the reverse linking signatures or messages from its corresponding chooser in node 3. And once the reverse linking signatures are received by sender B, it can determine the most efficient alt-route to use. Upon expiration of its preactivation timer, it will furthermore release the other alt-routes it has reserved for the other sender/chooser pair(s) to utilize, in this instance sender A.

These occurrences for sender B are illustrated in FIG. 3. In order to enhance the understanding of FIG. 3, specific times such as 100 ms, 300 ms, 10 sec and 20 sec are shown. But do bear in mind that these times are for illustration purposes and are not meant to limit the instant invention operation to those time periods. As shown, an alarm is detected at line 24, the beginning of the time line, by sender B that there is a failed link which, in this instance, is failed link 14b. See FIG. 2. At that point, a validation of the alarm takes place in accordance with a predetermined time period generated by the system. This is represented by arrow 26 and extends to line 28. This timer may be referred to herein after as an "alarm validation timer".

The purpose of the validation timer is, as its name implies, to validate that the alarm is indeed valid. This is needed because of the fact that the system does not want to begin restoring traffic to alt-routes if the alarm actually signifies some intermittent problems that are repairable by the node itself or intermediate line terminating equipment (LTEs). Such problems include for example equipment failure to which the above-mentioned conventional automatic protection switching, i.e. , switching on the equipment itself, can readily fix. In essence, the present invention system does not want to repair transient failures such as power surges by utilizing restoration. Rather, it focuses onto an actual fiber cut which in a linear transmission system cannot be typically protected against with automatic protection switching. Thus, given a predetermined time period in which there has been a determination that the fault results not from transient or intermittent interruption of traffic, i.e. , it is indeed a fiber cut, the system will take the next action at line 28. For the embodiment of the FIG. 2 example, the alarm validation timer is deemed to have been generated by the system to have a predetermined time period of 100 ms. This timer is independently set for each logical span.

Having thus provided the equipment protection switching time to correct transient failures rather than restore or trying to react immediately to any failure of traffic, the system next begins to perform its preactivation flooding, as indicated by line 30. In other words, at this point of time at line 28, it is deemed that the alarm is validated and preactivation flooding begins.

At the same time, a couple of timers are also generated by the system. The first of the timers is the so-called sender time-out timer shown by line 32. This timer provides a predetermined time period to ensure that the preactivation flooding by the sender, and its subsequent restoration, would not go on indefinitely, thereby tying up the system. In other words, a determination has to be made at some future time at which to declare that restoration is not possible, as for example when there are no alt-routes found. It should further be noted that it is assumed here that sender B has won the race and the second sender such as sender A in the same node is not allowed to flood at all because the first sender has now reserved all of the spare links that it floods into. In this instance, the second sender's sender time-out timer would not begin until the first sender has released the spare routes it had reserved. Under all circumstances, the sender timeout timer does not begin until flooding is actually accomplished on at least one span.

A second timer that is generated by the system which begins to operate at this time is a preactivation timer, as indicated on line 34. The preactivation timer does the following. It sets a predetermined time period during which it waits for the system to find, reserve and restore to an alt-route for the failed link of the sender/chooser pair to which it belongs. The preactivation timer further assures that extra alt-routes are reserved. Putting it differently, because of the greedy characteristic of the sender, the extra alt-routes are held onto for a limited period of time such as for example from 100 ms to 10 sec in the FIG. 3 embodiment, in anticipation of the failure of more links in the same logical span. The amount of time allocated for the preactivation timer is of course arbitrary.

At the expiration of the preactivation timer, designated by line 36 in FIG. 3, all unused alt-routes are released if there are no additional alarms detected on the node for that particular logical span. In other words, each logical span failure has its own preactivation timer and each individual sender, such as for example sender B, has its own sender time-out. Thus, the two senders A and B in the FIG. 2 embodiment each has its own sender time-out timer and each is running its own preactivation timer.

Once the preactivation timer 34 expires, its particular sender, sender B in the example of FIG. 2, is forced to release any unused alt-routes. And since the preactivation timer may be set typically half way or less than half way through the sender time-out, all of the senders which were competing for the spare links are provided extra time to actually locate, flood into and reserve those alt-routes or use those spare links now released by the first sender so as to reserve their own alt-routes. Putting it simply, by providing a preactivation timer, the greedy characteristic of the distributed restoration scheme is "released" ahead of the sender time-out by the first sender in order to allow other senders, which may otherwise time-out at precisely or near the same time as the original sender, time to find their own alt-routes. This therefore provides a more fair contention method based on the premise that reserved alt-routes should be held for a given period in anticipation of further failure of the links in a logical span, but these additional reserved alt-routes ought to be released for the use by other senders after a certain time period which in all likelihood would indicate that there are no other links that will fail within the same logical span, so that other senders may utilize this spare capacity.

Another timer generated by the system of the instant invention is a hold off timer, illustrated by line 38 in FIG. 3. As shown, the hold off timer has a predetermined timer period that extends from line 24 to line 40, a total of approximately 300 ms for this embodiment. This hold off timer is similar to the alarm validation timer in that, instead of holding off the preactivation flooding, it holds off the restoration process of the system until there is a clear determination that such restoration is not premature due to intermittent failures. For example, a hit on traffic through a link could mean the loss of the frame in the traffic or the loss of a signal for any length of time. In electronics, intermittent failures oftentimes entail very short durations. Thus, if there is a failure for example of an optical cable that is intermittent due to either dirt or intermittencies in the interface cards, alarms may be triggered and withdrawn rather rapidly on its own thereby toggling back and forth between the failed and the working states. The hold off timer is implemented to prevent this scenario so that an alarm needs to persist for a predetermined time period, 300 ms in this instant example, before restoration using restorative cross connects are allowed on that failure. Thus, even though flooding begins at line 28 at 100 ms, restoration actually does not take place until an alarm has persisted for an additional 200 ms, as indicated at line 40. This restoration process is indicated by line 42 which extends to the end line 44 of time line 22.

Do note that in FIG. 3, preactivation flooding 30 is shown to extend from line 28 to end line 44. Yet if alt-routes are released and no other links in a logical span are in alarm, then obviously there would not be any flooding. In other words, FIG. 3 shows preactivation flooding to extend all the way to end line 44. Yet, in actuality, such extended flooding would occur only if additional alarms have been detected and not sufficient number of alt-routes have been reserved to satisfy those additional failed links. Of course, flooding continues if no alt-route is found for the first failed link.

For the example shown in FIG. 3, the sender time-out 32 extends to the 20 sec end point. What this means is that the distributed restoration scheme of the instant invention has run its single iteration whereby the first of the multiple sender/chooser pairs will have released any unused alt-routes—whether due to the preactivation timer or the sender time-out. Any unused reserved, now released, spare links may therefore be utilized by some other sender, such as for example sender A.

Figure 4:
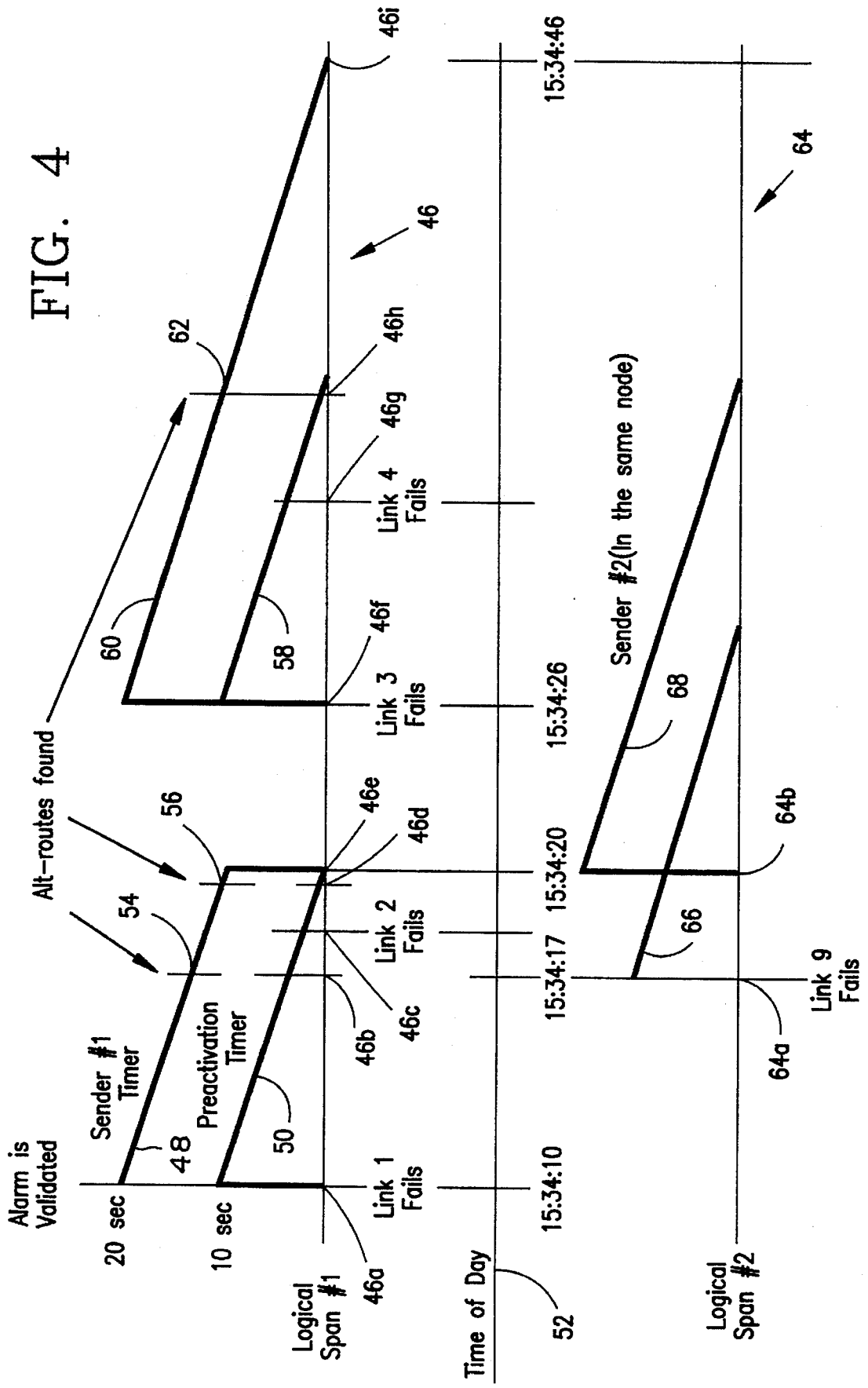
FIG. 4 illustrates the relationship between the preactivation timer and the sender time-out for different failed links of a particular span and its comparison with a second span.

An illustration of the relationship between the different timers is shown in FIG. 4. Here it is assumed that there are two senders in a particular node with each sender being connected via a logical span to its corresponding chooser node. For the sake of simplicity, the preactivation timer is deemed to have a predetermined time period of 10 sec while the sender time-out timer is deemed to have a predetermined expiration time of 20 sec.

As shown, for logical span number 1 whose time line is designated 46, it is assumed that there are at least 4 links, namely link 1, link 2, link 3 and link 4. When an alarm is validated at time 46a, a sender time-out, designated by downward sloping line 48, begins presumably for 20 sec in accordance with the examples shown in FIG. 3. The preactivation timer, at the same time 46a, begins to countdown its predetermined time period of 10 sec, designated by downward sloping line 50. To provide a time reference, a time of day line 52 is provided to show that the first link 1 failed at 15:34:10.

At time 46b, an alt-route 54 is deemed to have been found for restoring the traffic of failed link 1. As shown, this finding of the alt-route 54 occurs before the expiration of preactivation timer 50. Accordingly, the spare links reserved by sender 1 are not released.

At time 46c, a second link 2 in the same logical span 1 fails. Notice that a second alt-route 56 is then found for the second failed link 2 at time 46d, which remains prior to the expiration of preactivation timer 52. And since no additional failed links are found within the predetermined time period of preactivation timer 50, at time 46e (15:34:20), the preactivation timer 50 expires. At the same time, insofar as the traffic for all so far failed links have been restored via alt-routes, the sender time-out timer is likewise aborted at time 46e.

However, a short time thereafter, at time 46f (15:34:26), yet another link, namely link 3, fails in logical span number 1. With the failure of link 3, the whole process begins anew, as a second preactivation timer 58 begins a second 10 sec predetermined timer period, and a second sender 1 time-out of 20 sec, as indicated by line 60, begins.

As shown, an alt-route 62 is not found for failed link 3 until almost at the end of the predetermined time period of preactivation timer 58, at time 46h. However, before time 46h, at time 46g, yet another link, i.e., link 4, of logical span 1 fails. And since no additional alt-route is found for link 4, sender time-out 60 for sender 1 is allowed to run its full course until time 46i. At that time, since no other alt-routes are found to restore the traffic of failed link 4, in order not to tie up the system, a determination is made that restoration of failed link 4 is not possible, and all reserved spare alt-routes are released by sender 1.

As further shown in FIG. 4, a second sender 2, which may be equated with sender A in FIG. 2, also resides at the same node. It however is connected to its chooser node by means of a second logical span 2. As shown and with reference to its own time line 64, at time 64a (15:34:17), one of the links, namely link 9, in logical span 2 fails. The preactivation timer, designated 66, for sender 2 begins its countdown of its predetermined time period which is assumed to be the same as the preactivation timer of sender 1. But since all of the alt-routes have been reserved by sender 1, sender 2 would not begin its flooding until shortly after preactivation timer 50 of sender 1 has forced the release of unused spare links that were reserved by sender 1 at time 46e. Thus, for sender 2, its sender time-out 68 does not begin until time 64b, which is shortly after time 46e. And insofar as no alt-route is found for failed link 9 by sender 2 within the duration of sender time-out 68, the traffic traversing failed link 9 is not restored.

For the example shown in FIG. 4 with respect to sender 2, for the sake of clarity, it is assumed that links 3 and 4 of logical span 1 have not failed and that preactivation timer 58 and sender time-out 60 for sender 1 do not exist. For sender 2 in FIG. 4, its sender time-out is shown to have a shorter time duration than the sender time-outs of sender 1.

Thus, FIG. 4 illustrates two things. First, that with respect to sender 1, different sets of preactivation timers and sender time-out timers may be generated for different link failures in the same logical span. And if additional links failed after the expiration of a first preactivation timer, a second preactivation timer may be generated for those additional failed links, such as links 3 and 4. Second, FIG. 4 also shows, with respect to senders 1 and 2 (ignoring the additional failed links 3 and 4 of sender 1), that sender 2 will begin its own sender time-out as soon as the unused spare links previously reserved by sender 1 are forcedly released by the expiration of the preactivation timer of sender 1, in this instance 50 shown in FIG. 4.

Figure 5:
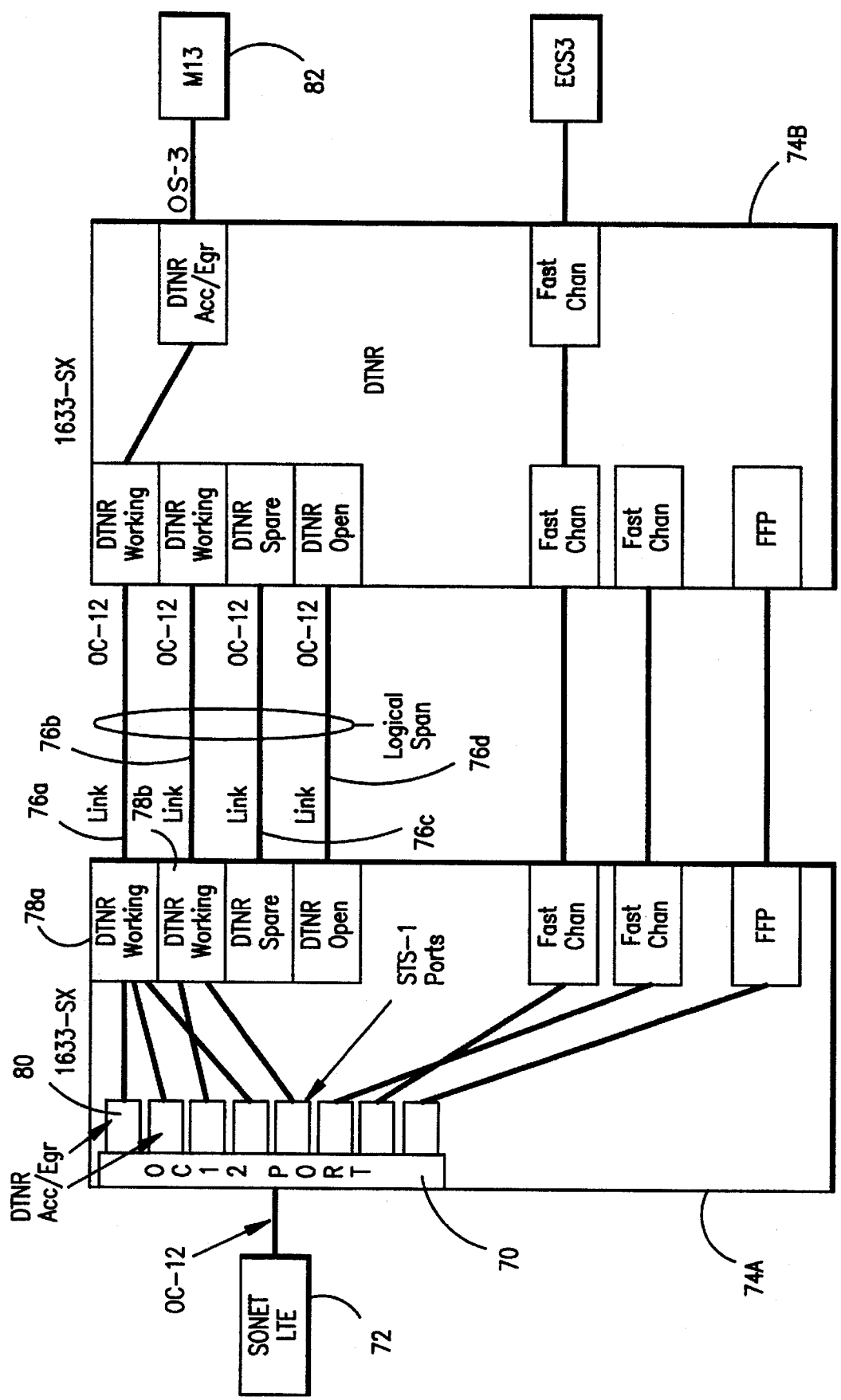
FIG. 5 is a block diagram illustrating two digital cross connect switches located at respective adjacent nodes to show the actual physical interconnection between adjacent nodes of the telecommunications network.

The hardware component utilized for the instant invention is shown in FIG. 5. There two digital cross connect switches 74a and 74b, such as model 1633-SX made by the Alcatel Network Systems Company, are illustrated to be connected to each other, as for example between any of the nodes shown in FIG. 2. As shown, each of the digital cross connect switches has a number of ports 70 that are shown to be multiplexed to a line terminating equipment (LTE) such as the SONET LTE 72. Each of the digital cross connect switches 74 has, as shown, two working links 76a and 76b, as well as one spare link 76c and one open link 76d. Do note that working links 76a and 76b correspond to the working links W shown in FIG. 2 and spare link 76c corresponds to the spare link S likewise shown in FIG. 2. For the purpose of the instant invention, it suffices to state that open link 76 is reserved for some later usage as a working link. Each link shown in FIG. 5 is a conventional optical carrier OC-12 fiber, or embedded within a higher order (i.e., OC-48 or OC-192) fiber.

With reference to digital cross connect switch 74a, it can be seen that the interfacing boards indicated as DTNR interface cards 78a and 78b in turn are routed to a number of STS-1 ports 80 for transmission to SONET LTE 72. Although not shown, an intelligence such as a processor resides in each of the digital cross connect switches to act as a generator of the different timers to provide the different predetermined time periods for the instant invention. Also not shown but present in each of the digital cross connect switches is a database storage for storing a mapping which deals with the identification of the various senders, choosers and indexes mentioned previously. A detector that may reside in SONET LTE 72 acts to detect any failure of links between the various digital cross connects switches. The detector may also be resident in the DTNR cards 78a and 78b as detection circuits for interpreting whether a communication failure has occurred at the respective links 76a and 76b.

Figure 6A:
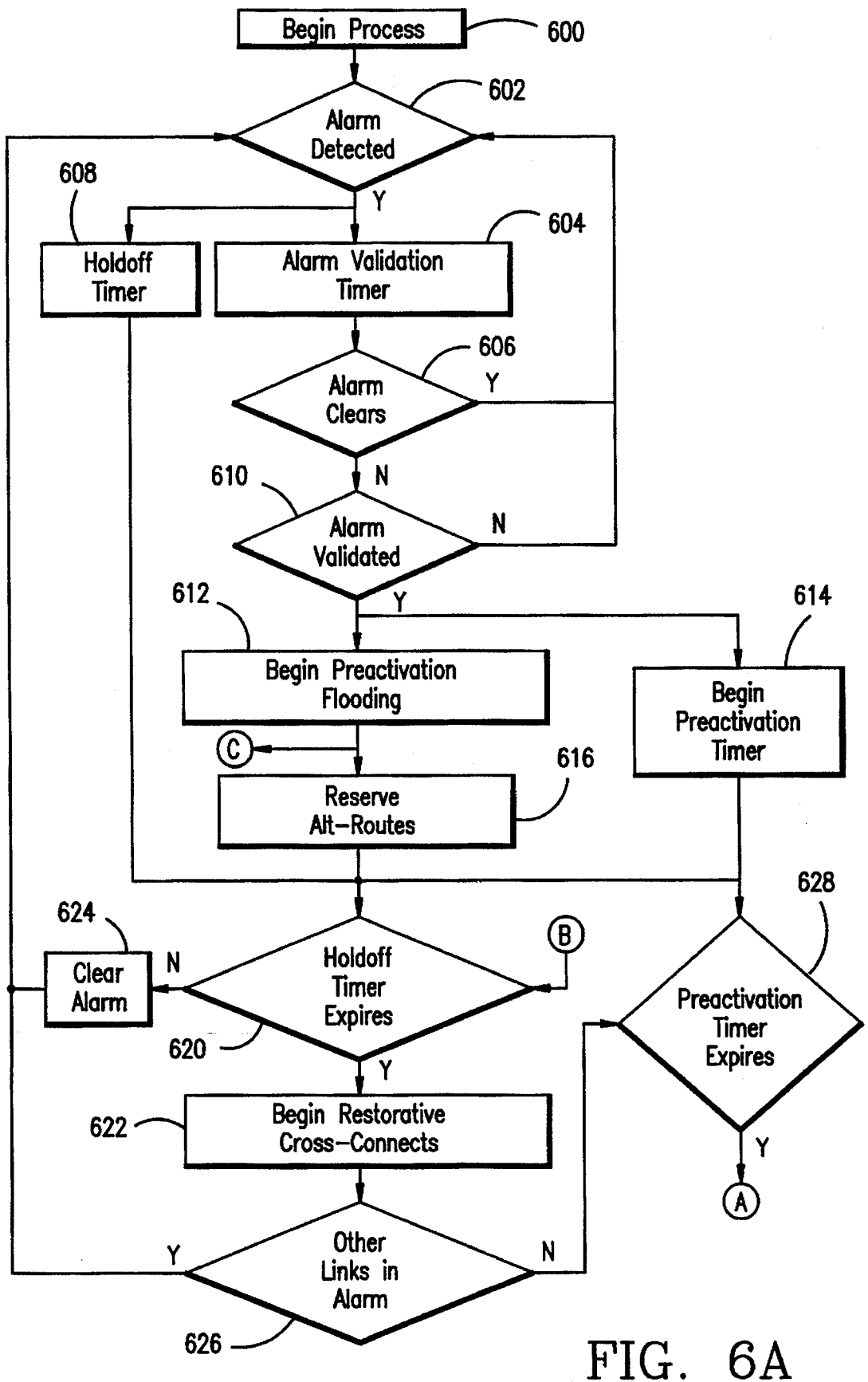
FIGS. 6A and 6B provide a flow diagram illustrating the operation of the instant invention.
Figure 6B:
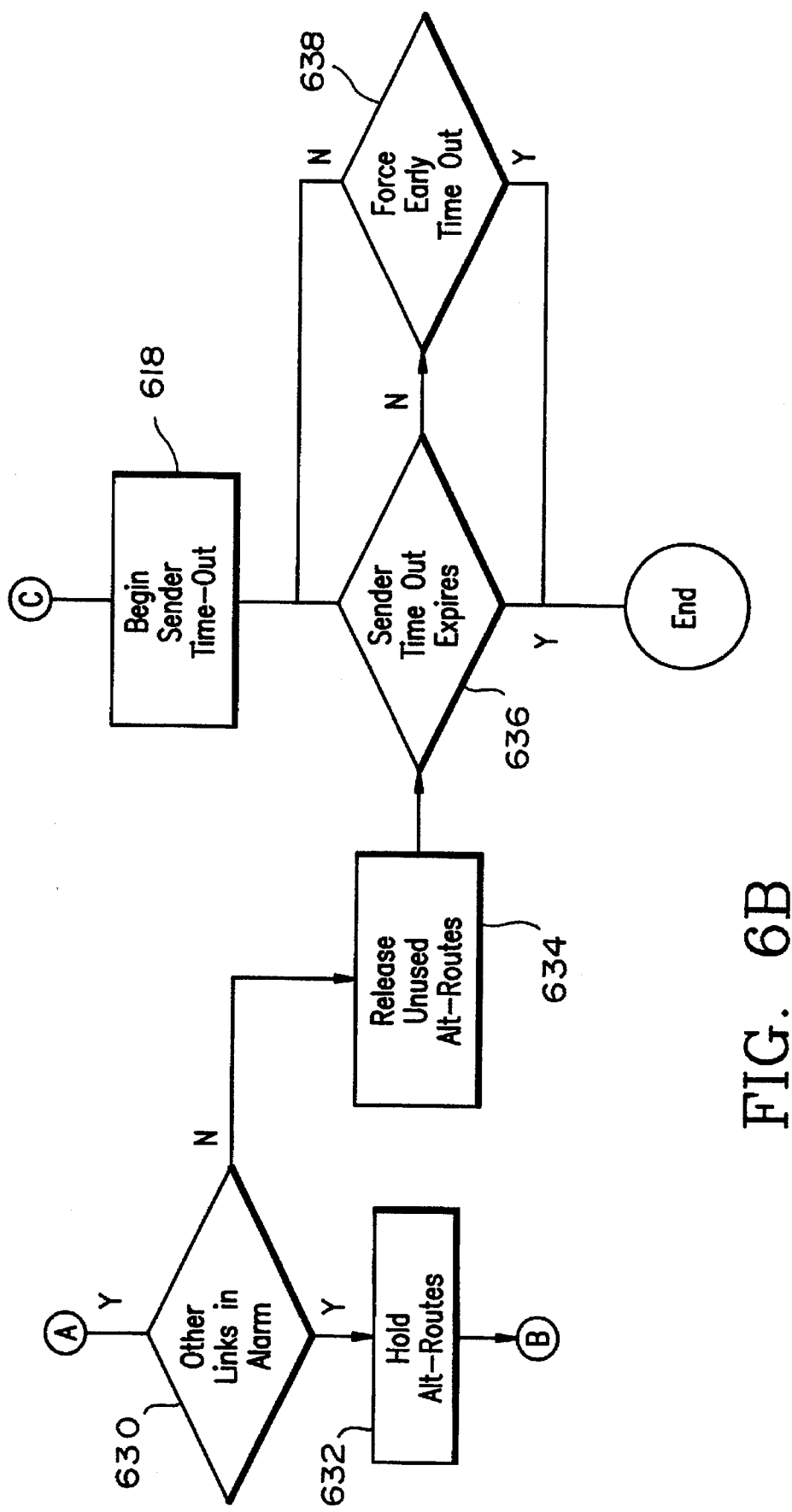

FIGS. 6A and 6B provide a flow chart for illustrating the operation of the instant invention system. As shown, the process begins at block 600. The alarm validation timer starts with detection of an alarm at block 602. With the detection of an alarm, the alarm validation timer is generated in block 604 by the system to provide a predetermined time period to ensure that the restoration process of the instant invention does not begin unless the automatic protection switching of the node fails to repair the problem. Thus, if the alarm is cleared at block 606, which means that the problem associated with the alarm has been corrected by the automatic protection switching, the process returns to block 602 to await the next alarm detection. Likewise, upon detection of an alarm, in addition to the generation of the alarm validation timer at block 604, a hold off timer is generated by the system in block 608.

Returning to the main branch of the flow chart of the instant invention, if an alarm is not cleared after decision block 606, then a determination is made in block 610 on whether the alarm is validated. If it is not validated, then the process returns back to block 602. If it is in fact validated, then preactivation flooding is activated at block 612. At the same time, a preactivation timer is generated for initiating a predetermined time duration at block 614.

With the initiation of the preactivation flooding, alt-routes or spare links that were found by the flooding are reserved at block 616. At the same time, a sender time-out timer is generated and begins its countdown to sender time-out at block 618 shown in FIG. 6B.

Next, depending on whether the hold off timer has expired, as designated in block 620, restoration of an alt-route begins at block 622. If the hold off timer has not expired, the alarm is cleared in block 624 as it is deemed to have been a transient interruption on the link. Then the process is returned to block 602 to await the next alarm.

Once restoration process has begun in block 622, a determination is made on whether other links are in alarm in block 626. If there are, then these alarms are detected in block 602. If they are not, then the process awaits the expiration of the preactivation timer in block 628. If it has expired, a determination is again made on whether there are other links in the logical span which are in alarm in block 630. If there are, the alt-routes are held and not released in block 632 for restoring the traffic of those other failed links. Thereafter, before restoration process for those other failed links is to take place, the process returns to block 620 to determine whether the hold off timer has expired.

If there are no other links in alarm, as determined in block 630, then all unused alt-routes or spare links are released in block 634. Thereafter, the process is routed to block 636 for a determination of whether the sender time-out has expired. If it has not, then a determination is made on whether or not there is a forced early time-out, such as by the operator of the system, in block 638. If there is no a forced early time-out, the process returns to block 636 to await the expiration of the sender time-out. If there is, the process would end. Similarly, once the sender time-out expires, the process ends.

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the invention be limited only by the spirit and scope of appended claims.

We claim:

1. In a telecommunications network having a plurality of nodes each communicatively connected to one of the other nodes, a first node communicatively connected to at least one other node via at least one of a plurality of circuits and at least another node via another one of said plurality of circuits, a method of restoring communication between said first node and said other or another node when communication failure occurs at least one of said one or another circuits, comprising the steps of:

(a) detecting a first alarm resulting from the first of said communication failures of said one or another circuits;

(b) establishing between said first node and the first of either said other or another nodes a corresponding pair of first sender and first chooser for the first detected failed circuit;

(c) establishing a first predetermined time period;

(d) searching for spare circuits of said network with restoration messages from said first sender to find an alternate route between said pair of first sender and first chooser;

(e) reserving the spare circuits having received said restoration messages from said first sender as potential circuits for establishing said alternate route;

(f) restoring communication between said first sender and said first chooser if there are sufficient reserved spare circuits to establish said alternate route; and (g) releasing any unused reserved spare circuits at the end of said first predetermined time period only if said alternate route is established between said first sender and said first chooser during said first predetermined time period.

2. The method of claim 1, further comprising the step of:
   establishing a second predetermined time period at the end of which said first sender ceases sending said restoration messages and any reserved circuits are released even if no alternate route is found for said first detected failed circuit.

3. The method of claim 1, further comprising the steps of:
   establishing a third predetermined time period;
   holding off restoring communication between said first sender and said first chooser until the end of said third predetermined time period so as to allow a sufficient number of said spare circuits to be flooded with said restoration messages.

4. The method of claim 1, further comprising the step of:
   validating the detection of said first alarm before initiating either of said steps (c) or (d) so as to avoid equating transient interruptions to the circuits of said network with communication failures.

5. The method of claim 1, wherein said step (e) timber comprises the steps of:
   sending complementary restoration messages from said first chooser to said reserved spare circuits;
   reverse linking selected ones of said reserved spare circuits having received said restoration signals and said complementary restoration signals from said first chooser to said first sender to establish said alternate route.

6. The method of claim 1, further comprising the step of:
   terminating said restoring step after a time-out period if no alternate route is found between said first sender and first chooser.

7. The method of claim 1, further comprising the steps of:
   detecting a second alarm resulting from another communication failure;
   establishing a corresponding pair of second sender and second chooser between said first node and another one of said other or another node;
   detecting the release of said any unused spare circuits by said first sender;
   effecting said second sender to flood spare circuits of said network including said unused reserved spare circuits released by said first sender with second restoration messages;
   establishing a second alternate route using selected ones of said spare circuits for restoring communication between said second sender and said second chooser.

8. The method of claim 7, wherein said establishing a second alternate route step further comprises the steps of:
   effecting said second chooser to send out second complementary restoration messages to said unused spare circuits of said network to reserve said selected ones of said spare circuits;
   reverse linking said selected ones of said reserved spare circuits having received said second restoration and second complementary restoration messages from said second chooser back to said second sender to establish said second alternate route.

9. The method of claim 7, further comprising the step of:
   terminating said establishing second alternate route step after a time-out period if no alternate route is found between said second sender and said second chooser.

10. In a telecommunications network having a plurality of nodes each communicatively connected to at least an adjacent node, a first node communicatively connected to a second node via at least one of a plurality of circuits, a method of restoring communication between said first node and said second node when a communication failure occurs at one circuit and potential communication failures may occur at others of said plurality of circuits, comprising the steps of:

(a) detecting an alarm resulting from said communication failure of said one circuit;

(b) establishing between said first and second nodes a corresponding pair of sender and chooser for said one circuit;

(c) searching for spare circuits of said network through which an alternate route may be established between said sender and chooser with restoration messages from said sender;

(d) reserving the spare circuits having received said restoration messages from said sender as potential circuits for establishing said alternate route;

(e) establishing a first time period at the end of which said sender ceases sending said restoration messages and said reserved circuits are released, and a second time period whose duration ends before the end of said first time period; and (f) releasing any unused reserved spare circuits at the end of said second time period instead of waiting until the end of said first time period if said alternate route is established between said sender and said chooser during the duration of said second time period.

11. The method of claim 10, further comprising the steps of:

establishing a third predetermined time period;

holding off restoring communication between said sender and said chooser until the end of said third predetermined time period so as to allow said restoration messages to flood a sufficient number of said spare circuits.

12. The method of claim 10, further comprising the step of:

validating the detection of said alarm before initiating either of said steps (c) or (d) so as to avoid equating transient interruptions to the circuits of said network with communication failures.

13. The method of claim 10, further comprising the steps of:

restoring communication between said first and second nodes including sending complementary restoration messages from said chooser to said reserved spare circuits;

reverse linking selective ones of said reserved spare circuits having received said restoration and complementary restoration messages from said chooser back to said sender to establish said alternate route.

14. The method of claim 10, further comprising the step of:

terminating any attempt to restore said second communication failure after a time-out period if no alternate route is found between said sender and said chooser.

15. The method of claim 10, further comprising the steps of:

detecting a second alarm from a second communication failure resulting from a second failed circuit;

establishing a corresponding pair of second sender and second chooser between the nodes sandwiching said failed circuit;

detecting the release of said any unused spare circuits by said first sender;

effecting said second sender to flood spare circuits of said network including said any unused reserved spare circuits released by said first sender with second restoration messages;

establishing a second alternate route for said second failed circuit using selected ones of said any unused spare circuits for restoring communication between said second sender and said second chooser.

16. The method of claim 15, wherein said establishing a second alternate route further comprises the steps of:

effecting said second chooser to send out second complementary restoration messages to said any unused spare circuits of said network to reserve said selected ones of said any unused spare circuits;

reverse linking said selected ones of said reserved spare circuits having received said second restoration and second complementary restoration messages from said second chooser back to said first sender to establish said second alternate route.

17. The method of claim 15, further comprising the step of:

terminating any attempt to restore said second communication failure after a time-out period if no alternate route is found between said second sender and second chooser.

18. In a telecommunications network having a plurality of nodes each communicatively connected to one of the other nodes, a first node communicatively connected to at least one adjacent node via at least one of a plurality of spans each having a plurality of links and a plurality of other nodes via a corresponding plurality of other spans each having multiple links, a method of restoring communication between said first node and said adjacent and other nodes when communication failures occur at least one link of said one span and at least one other link of said other spans, comprising the steps of:

(a) detecting a first alarm resulting from the failure of the first of said one link or said other link;

(b) establishing a pair of first sender and first chooser for said first node and the node which together sandwich said first failed link;

(c) establishing a first predetermined time period;

(d) searching for spare links of said network with first restoration messages from said first sender;

(e) reserving the spare links having received said first restoration messages from said first sender;

(f) sending out reverse linking messages from said first chooser to said spare links when said first chooser detects said restoration messages;

(g) restoring communication between said first sender and said first chooser by connecting selected ones of said reserved spare links having both said restoration and reverse linking messages;

(h) establishing a second predetermined time period at the end of which said restoring step is terminated; and (i) releasing any unused reserved spare links at the end of said first predetermined time period if an alternate route for said first sender and said first chooser was found during said first predetermined time period.

19. The method of claim 18, further comprising the steps of:

(j) detecting another alarm resulting from the failure of another of said one link or said other links;

(k) establishing a pair of another sender and another chooser between said first node and the node to which said another failed link is connected;

(l) flooding said any unused spare links of said network with another restoration messages from said another sender;

(m) sending another reverse linking messages from said another chooser to the spare links when said another chooser receives said another restoration messages;

(n) restoring communication between said another sender and said another chooser by connecting selected ones of said spare links having both said another restoration and another reverse linking messages.

20. The method of claim 19, further comprising the step of:

(o) repeating steps (j) to (n) until communications cut off by all failed links are restored.

21. The method of claim 18, further comprising the steps of:

establishing a third predetermined time period;

holding off restoring communications between said first sender and said first chooser until the end of said third predetermined time period so as to allow a sufficient number of said spare links to be flooded by said restoration messages.

22. The method of claim 18, further comprising the step of:

validating the detection of said first alarm before initiating either of said steps (d) or (e) so as to avoid equating transient interruptions to the links of said network with link failures.

23. The method of claim 19, wherein step (n) further comprises the step of:

terminating connection of selected ones of said reserved spare links at the end of said second predetermined time period irrespective of whether an alternate route between said first sender and said first chooser has been found.

24. The method of claim 18, wherein step (h) further comprises the step of:

terminating connection of selected ones of said reserved spare links at the end of said second predetermined time period irrespective of whether an alternate route between said another sender and said another chooser has been found.

25. In a telecommunications network having a plurality of nodes each communicatively connected to at least one of the other nodes, a first node communicatively connected to at least a second node via at least one of a plurality of spans each having multiple links, a method of restoring communication between said first node and said second node when communication failure occurs at least one link of said one span, comprising the steps of:

(a) detecting a first alarm resulting from the failure of said one link;

(b) establishing a pair of sender and chooser for said first node and said second node;

(c) allocating a first predetermined time period;

(d) flooding spare links of said network with first restoration messages from said sender;

(e) reserving the spare links having received said first restoration messages from said sender;

(f) sending out reverse linking messages from said chooser to said spare links when said chooser detects the first of said restoration messages;

(g) restoring communication between said sender and said chooser by connecting selected ones of said reserved spare links having both said restoration and reverse linking messages;

(h) establishing a second predetermined time period at the end of which said restoring step is terminated; and (i) releasing any unused reserved spare links at the end of said first predetermined time period if an alternate route for said sender and said chooser was found during said first predetermined time period and no other links within said one span failed within said first predetermined time period.

26. The method of claim 25, further comprising the steps of:

(j) detecting another alarm resulting from the failure of another link of said span; (k) restoring communication between said first and second nodes via a second alternate route if there are sufficient links reserved in said step (e) and if said another link failure occurred within said first predetermined time period.

27. The method of claim 25, further comprising the step of: (l) repeating steps (j) to (k) until all links of said span failed during said first predetermined time period are restored.

28. The method of claim 25, further comprising the steps of:

establishing a third predetermined time period;

holding off restoring communication between said sender and said chooser until the end of said third predetermined time period so as to allow a sufficient number of said spare links to be flooded by said restoration messages.

29. The method of claim 25, further comprising the step of:

validating the detection of said first alarm before initiating either of said steps (d) or (e) so as to avoid equating transient interruptions to the links of said span with link failures.

30. The method of claim 25, further comprising the step of:

terminating said step (g) at the end of said second predetermined time period irrespective of whether an alternate route between said sender and said chooser has been found.

31. In a telecommunications network having a plurality of nodes each communicatively connected to one of the other nodes, a first node communicatively connected to at least one other node via at least one of a plurality of circuits and at least another node via another one of said plurality of circuits, a system for restoring communication between said first node and said other or another node when communication failure occurs at least one of said one or another circuits, comprising:

detector means for detecting a first alarm resulting from the first of said communication failures of said one or another circuits;

means for establishing between said first node and the first of either said other or another nodes a corresponding pair of first sender and first chooser for the first detected failed circuit;

timer means for generating a first predetermined time period;

means for flooding spare circuits of said network with restoration messages from said first sender to find an alternate route between said pair of first sender and first chooser;

means for reserving the spare circuits having received said restoration messages from said first sender as potential circuits for establishing said alternate route;

restore means for restoring communication between said first sender and said first chooser if there are sufficient reserved spare circuits to establish said alternate route; and means for releasing any unused reserved spare circuits at the end of said first predetermined time period if said alternate route is established between said first sender and said first chooser during said first predetermined time period.

32. System of claim 31, wherein said timer means further generates a second predetermined time period at the end of which said first sender ceases sending said restoration messages and said any unused reserved circuits are released even if no alternate route is found for said first detected failed circuit.

33. System of claim 31, wherein said timer means further generates a third predetermined time period; and wherein said restore means holds off restoring communication between said first sender and said first chooser until the end of said third predetermined time period so as to allow a sufficient number of said spare circuits to be flooded with said restoration messages.

34. System of claim 31, further comprising:

means for validating the detection of said first alarm by said detector means to avoid equating transient interruptions to the circuits of said network with communication failures.

35. System of claim 31, wherein said first chooser comprises:

means for sending complementary restoration messages to said reserved spare circuits;

said system further comprising:

means for reverse linking selected ones of said reserved spare circuits having received said restoration messages and said complementary restoration messages to establish said alternate route.

36. System of claim 31, wherein said timer means further generates a time-out period at the end of which said restore means terminates all restoration process if no alternate route is found between said first sender and first chooser.

37. System of claim 31, wherein said detector means further detects a second alarm resulting from another communication failure, said system further comprising:

means establishing a corresponding pair of second sender and second chooser between said first node and another one of said other or another node;

second detector means for detecting the release of any unused spare circuits by said first sender;

said second sender including means to flood spare circuits of said network including any unused reserved spare circuits with second restoration messages; and said restore means establishing a second alternate route using selected ones of said spare circuits for restoring communication between said second sender and said second chooser.

38. System of claim 37, wherein said second chooser further comprises:

means for sending out second complementary restoration messages to said spare circuits of said network to reserve said selected ones of said spare circuits; and means for reverse linking said selected ones of said reserved spare circuits having received said second restoration and second complementary restoration messages from said second chooser back to said second sender to establish said second alternate route.

39. System of claim 37, wherein said restore means further terminates establishing said second alternate communication path step after a time-out period if no alternate route is found between said second sender and said second chooser.

40. System in a telecommunications network having a plurality of nodes each communicatively connected to one of the other nodes, a digital cross connect switch means located at each of said nodes to provide communication with the other nodes, a first node communicatively connected to at least a second node via at least one of a plurality of spans each having multiple links, a pair of cross connect switch means at said respective first and second nodes for restoring communication between said first node and said second node when communication failure occurs at least one link of said one span, each of said cross connect switch means having detector means for detecting a first alarm resulting from the failure of said one link, said system comprising:

means for establishing a pair of sender and chooser for said first node and said second node, respectively, when said first alarm is detected, said sender having a sender cross connect switch means and said chooser having a chooser cross connect switch means;

said sender cross connect switch means including:

timer means for allocating a first predetermined time period during which any alternate routes found to replace said first detected failed link is held;

flooding means for flooding spare links of said network with first restoration messages from said sender;

reserve means for reserving the spare links having received said first restoration messages from said sender;

said chooser cross connect switch means including means for sending out reverse linking messages to said spare links when said chooser cross connect means detects the first of said restoration messages;

restore means for restoring communication between said sender and said chooser by connecting selected ones of said reserved spare links having both said restoration and reverse linking messages;

said timer means establishing a second predetermined time period at the end of which said restore means terminates its operation;

said reserve means releasing any unused reserved spare links at the end of said first predetermined time period if an alternate route for said sender and said chooser was found during said first predetermined time period and no other links within said one span failed within said first predetermined time period.

41. System of claim 40, wherein upon detection of another alarm resulting from the failure of another link of said span, said restore means further restores communication between said first and second nodes via a second alternate route if there are sufficient links reserved and if said another link failure occurred within said first predetermined time period.

42. System of claim 41, wherein said timer means further generates a third predetermined time period; and said restore means holding off restoring communication between said sender and said chooser until the end of said third predetermined time period so as to allow a sufficient number of said spare links to be flooded by said restoration messages.

43. System of claim 42, further comprising:

means for validating the detection of said first alarm before allowing said flooding means to flood the spare links of said network and said restore means to restore communication between said sender and said chooser to thereby avoid equating transient interruption to the links of said span with link failures.

44. System of claim 40, wherein said restore means further terminates its operation at the end of said second predetermined time period irrespective of whether an alternate route between said sender and said chooser has been found.

* * * * *